US012234914B2

(12) United States Patent
Oka (10) Patent No.: US 12,234,914 B2
(45) Date of Patent: Feb. 25, 2025

(54) SLIDING COMPONENT (71) Applicant: Eagle Industry Co., Ltd., Tokyo (JP)

(72) Inventor: Masao Oka, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 37 days.

(21) Appl. No.: 17/636,786

(22) PCT Filed: Aug. 25, 2020

(86) PCT No.: PCT/JP2020/032010
§ 371 (c)(1),
(2) Date: Feb. 18, 2022

(87) PCT Pub. No.: WO2021/044904
PCT Pub. Date: Mar. 11, 2021

(65) Prior Publication Data
US 2022/0275865 A1 Sep. 1, 2022

(30) Foreign Application Priority Data

Sep. 2, 2019 (JP) ................................ 2019-159594

(51) Int. Cl.
*F16J 15/34* (2006.01)
*F16C 17/04* (2006.01)

(52) U.S. Cl.
CPC ............... *F16J 15/34* (2013.01); *F16C 17/04* (2013.01)

(58) Field of Classification Search
CPC ......... F16C 17/045; F16C 17/04; F16J 15/34; F16J 15/3404
See application file for complete search history.

(56) References Cited

U.S. PATENT DOCUMENTS 3,855,624 A * 12/1974 Reinhoudt ............ F16C 17/045
3,870,382 A * 3/1975 Reinhoudt ............ F16C 17/045
                                                         384/123
5,066,026 A * 11/1991 Heck .................... F16J 15/3412
                                                         277/400
5,092,612 A    3/1992 Victor et al. ............. F16J 15/34
(Continued)

FOREIGN PATENT DOCUMENTS

CN      106763792      5/2017
EP        2940353      11/2015 ............... F16J 15/34
(Continued)

OTHER PUBLICATIONS

International Preliminary Report on Patentability issued in PCT/JP2020/032010, dated Mar. 8, 2022, 6 pages.
(Continued)

*Primary Examiner* — Eugene G Byrd
(74) *Attorney, Agent, or Firm* — HAYES SOLOWAY P.C.

(57) ABSTRACT

A sliding component includes a pair of seal rings which are arranged to rotate relative to each other. The seal rings have sliding surfaces, respectively, which are facing each other. The sliding surfaces are provided with: a land continuously extending in a circumferential direction; inward recessed portions recessed in an axial direction, extending to a radially inner side, and open to the radially inner side; and outward recessed portions recessed in the axial direction, extending to a radially outer side, and open to the radially outer side.

19 Claims, 8 Drawing Sheets

(56) References Cited

U.S. PATENT DOCUMENTS

| | | | | |
|---|---|---|---|---|
| 5,222,743 | A | * | 6/1993 | Goldswain ............ F16J 15/3412 |
| | | | | 277/400 |
| 5,368,314 | A | * | 11/1994 | Victor ................... F16J 15/3412 |
| | | | | 277/400 |
| 6,213,473 | B1 | * | 4/2001 | Lebeck .................. F16J 15/342 |
| | | | | 277/408 |
| 2013/0016935 | A1 | * | 1/2013 | Cooley .................. E21B 4/003 |
| | | | | 384/129 |
| 2015/0184752 | A1 | | 7/2015 | Itadani ................. F16J 15/3412 |
| 2017/0227056 | A1 | | 8/2017 | Inoue et al. ............. F16C 33/74 |
| 2018/0073394 | A1 | * | 3/2018 | Tokunaga ............ F16J 15/3412 |
| 2019/0376558 | A1 | | 12/2019 | Kimura et al. ......... F16C 33/10 |

FOREIGN PATENT DOCUMENTS

| | | | | |
|---|---|---|---|---|
| EP | 4080090 | | 10/2022 | |
| EP | 4177485 | | 5/2023 | |
| GB | 2197396 | | 5/1988 | |
| JP | 61099717 | * | 5/1986 | |
| JP | 63-190975 | | 8/1988 | .............. F16J 15/34 |
| JP | 2001032904 A | * | 2/2001 | .............. F16C 17/04 |
| JP | 2013050191 A | * | 3/2013 | |
| JP | 2013072449 A | * | 4/2013 | |
| JP | 2017-207209 | | 11/2017 | .............. F16C 33/10 |
| JP | 2018185027 A | * | 11/2018 | ............ F16C 17/102 |
| SU | 1707372 | | 1/1992 | |
| WO | WO 2014/103631 | | 7/2014 | .............. F16J 15/34 |
| WO | WO 2018/139231 | | 8/2018 | .............. F16J 15/34 |

OTHER PUBLICATIONS

International Search Report and Written Opinion issued in PCT/JP2020/032010, dated Oct. 13, 2020, with English translation, 15 pages.

European Search Report issued in related application 20859735.1, dated Sep. 1, 2024, 7 pages.

Extended European Search Report issued in related application 24156603.3-1009, dated Jun. 13, 2024, 8 pages.

Office Action issued in Chinese Patent Appln. Serial No. 202080059723.2, dated May 31, 2024, with English translation, 15 pages.

Office Action issued in Chinese Patent Appln. Serial No. 202080059723.2, dated Oct. 23, 2024, with English translation, 16 pages.

* cited by examiner

ROTATION DIRECTION OF ROTATING SEAL RING

ROTATION DIRECTION OF ROTATING SEAL RING

SLIDING COMPONENT

TECHNICAL FIELD

The present invention relates to a sliding component subjected to relative rotation, for example, a sliding component used in a seal device that seals a rotating shaft of an automobile, a general industrial machine, or a rotating machine in other sealing fields, or a sliding component used in a bearing of an automobile, a general industrial machine, or a machine in other bearing fields.

BACKGROUND ART

A sliding surface of a sliding component used in a seal device or bearing is formed to be smooth, and thereby a loss in durability or energy is reduced. For example, as a seal device that prevents leakage of a sealed fluid, a mechanical seal includes a pair of annular seal rings of which the sliding surfaces rotate relative to each other and slide against each other. As one example of such a mechanical seal, Patent Citation 1 discloses a mechanical seal which includes a stationary seal ring and a rotating seal ring and in which a large number of dimples are formed in a sliding surface of one of the seal rings.

CITATION LIST

Patent Literature

Patent Citation 1: JP 2017-207209 A (PAGE 5, FIG. 1)

SUMMARY OF INVENTION

Technical Problem

In the sliding component as in Patent Citation 1, the sealed fluid is held in the dimples during use, so that the sealed fluid intervenes between the sliding surfaces, and the frictional force generated between the sliding surfaces is reduced. Thereby, each of the sliding surfaces is unlikely to wear. In addition, each of the sliding surfaces has a microscopically uneven shape, and a part of a protruding portion is chipped off to generate fine wear debris, and the wear debris flows into and is collected in any of the dimples. Meanwhile, each of the sliding surfaces forms a surface layer that is physically and chemically stable in a microscopic point of view, and a base portion of the sliding component is exposed at a chipped location of the protruding portion at which a part is chipped off, and enters a state where the base portion is likely to bond with another member which is more active than the surface layer, for example, the chipped wear debris. In addition, since the wear debris collected in the dimple can flow out between the sliding surfaces from the dimple again due to relative movement of the sliding components, the wear debris is likely to remain between the sliding surfaces, and as a result of the generation of deposit parts on the sliding surface at other locations, the sliding surface is likely to be damaged, which is a problem.

The present invention has been made in light of such a problem, and an object of the present invention is to provide a sliding component in which damage to a sliding surface can be reduced.

Solution to Problem

In order to solve the above problem, a sliding component according to the present invention is a sliding component including a pair of seal rings which are arranged to rotate relative to each other, wherein the seal rings have sliding surfaces, respectively, which are facing each other, and the sliding surfaces are provided with: a land continuously extending in a circumferential direction; inward recessed portions recessed in an axial direction, extending to a radially inner side, and open to the radially inner side; and outward recessed portions recessed in the axial direction, extending to a radially outer side, and open to the radially outer side. According to the aforesaid feature of the present invention, since at least the inward recessed portions and the outward recessed portions are arranged in the circumferential direction, wear debris generated in the land as the pair of seal rings rotate relative to each other moves along with the relative rotation, is collected in the inward recessed portion or the outward recessed portion, and is promptly discharged to the outside. For this reason, damage to the sliding surfaces can be reduced.

It may be preferable that the inward recessed portions and the outward recessed portions overlap each other in a view of the circumferential direction. According to this preferable configuration, the wear debris chipped off from the land is likely to be reliably collected in the inward recessed portion or the outward recessed portion as the pair of seal rings rotate relative to each other.

It may be preferable that radially outer ends of the inward recessed portions and radially inner ends of the outward recessed portions are aligned with each other in the circumferential direction. According to this preferable configuration, the wear debris chipped off from the land is likely to be reliably collected in the inward recessed portions or the outward recessed portions as the pair of seal rings rotate relative to each other.

It may be preferable that the inward recessed portions and the outward recessed portions are alternately arranged at equal intervals in the circumferential direction. According to this preferable configuration, the wear debris chipped off from the land is likely to be reliably collected in the inward recessed portions or the outward recessed portions as the pair of seal rings rotate relative to each other.

It may be preferable that each of the inward recessed portions and each of the outward recessed portions have a line-symmetrical shape with respect to radial lines, respectively. According to this preferable configuration, the wear debris can be reliably collected in any rotation direction.

It may be preferable that each of the inward recessed portions is formed to increase in width toward the radially inner side, and each of the outward recessed portions is formed to increase in width toward the radially outer side. According to this preferable configuration, the wear debris collected in the inward recessed portions is more likely to be discharged to the radially inner side than to the sliding surface, and the wear debris collected in the outward recessed portions is more likely to be discharged to the radially outer side than to the sliding surface.

It may be preferable that a peripheral edge of each of the inward recessed portions and the outward recessed portions is curved. According to this preferable configuration, the wear debris collected in the inward recessed portions or the outward recessed portions is likely to be smoothly discharged to the radially inner side or the radially outer side of the sliding surface.

It may be preferable that the land, the inward recessed portions, and the outward recessed portions are formed in the sliding surface of one of the seal rings. According to this preferable configuration, since the relative positions of the land, the inward recessed portions, and the outward recessed portions are not shifted, not only the structure can be simplified, but also reliable sealing between the radially inner side and the radially outer side can be provided.

It may be preferable that the land extends in the circumferential direction throughout an entire circumference. According to this preferable configuration, sealing performance can be improved.

It may be preferable that the inward recessed portions and the outward recessed portions have dimensions in the circumferential direction longer than respective dimensions in the axial direction. According to this preferable configuration, the wear debris collected in the inward recessed portions or the outward recessed portions is likely to be discharged to the radially inner side or the radially outer side of the sliding surface.

It may be preferable that the land is formed of a diamond like carbon (abbreviated to DLC) film or a titanium nitride (abbreviated to TiN) film. According to this preferable configuration, the height of the land can be made extremely low, and the coefficient of friction generated between the sliding surfaces is likely to be reduced.

DESCRIPTION OF EMBODIMENTS

Modes for implementing a sliding component according to the present invention will be described below based on embodiments.

First Embodiment

A sliding component according to a first embodiment of the present invention will be described with reference to FIGS. 1 to 5. Incidentally, in the present embodiment, a mode in which the sliding component is a mechanical seal will be described as an example. In addition, a description will be given based on the assumption that a radially outer side of a seal ring forming the mechanical seal is a sealed liquid side (e.g., high-pressure side) as a sealed fluid side and a radially inner side is an atmosphere side (e.g., low-pressure side) as a leakage side. In addition, for convenience of description, in the drawings, dots may be applied to a recessed portion formed in the sliding surface.

Figure 1:
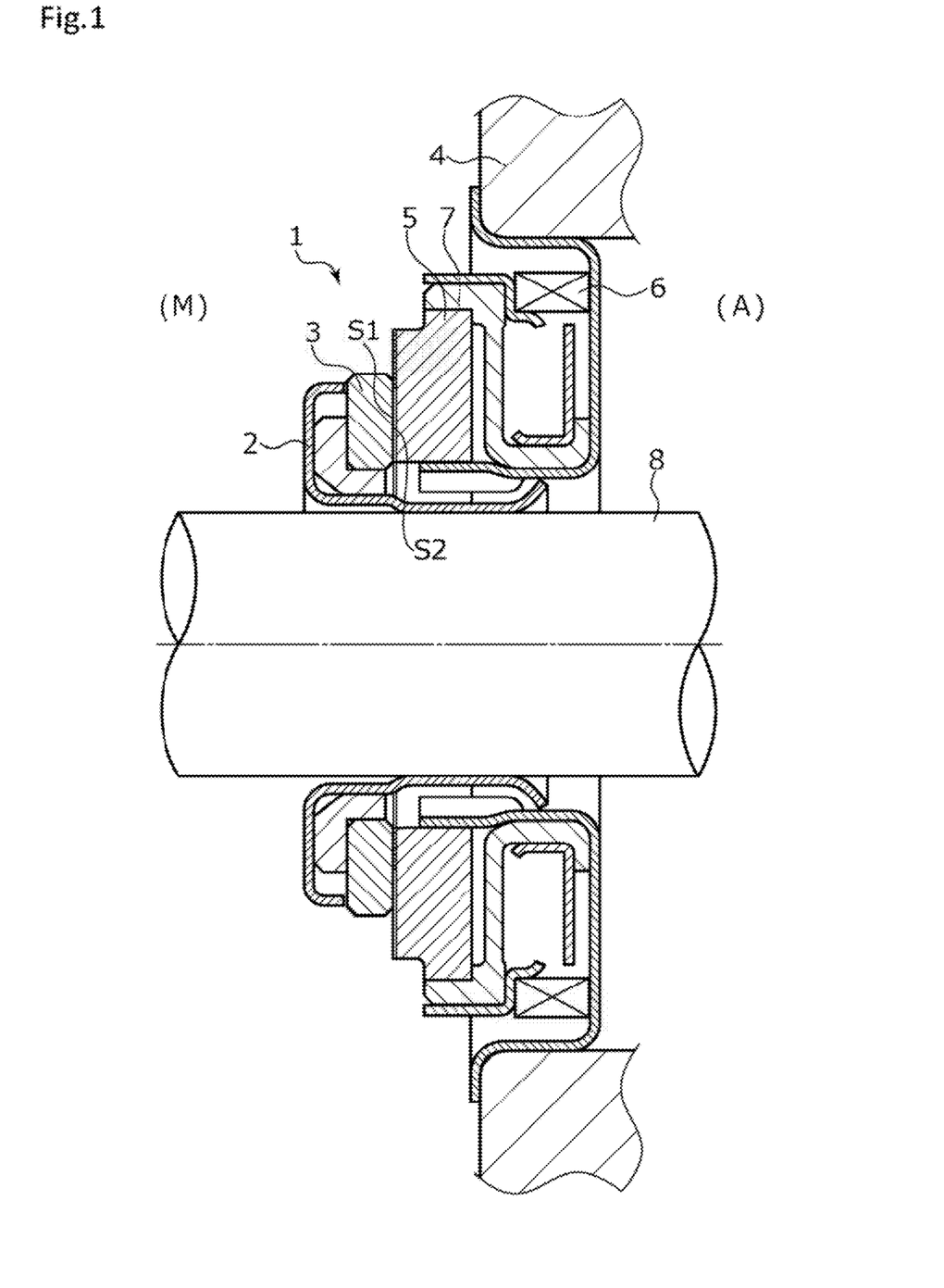
FIG. 1 is a longitudinal sectional view showing one example of a mechanical seal including a sliding component according to a first embodiment of the present invention.

A mechanical seal 1 for general industrial machines shown in FIG. 1 is an inside mechanical seal that seals a sealed liquid L tending to leak from the radially outer side of sliding surfaces toward the radially inner side, and mainly includes a stationary seal ring 5 as an annular seal ring that is a sliding component provided in a housing 4 of an attached device so as not to be rotatable but be movable in an axial direction, and a rotating seal ring 3 as an annular seal ring that is a sliding component provided on a side of a rotating shaft 8, which drives a pump impeller (not shown) on a high-pressure fluid side, via a sleeve 2 so as to be integrally rotatable with the rotating shaft 8.

The stationary seal ring 5 and the rotating seal ring 3 are configured such that a sliding surface S1 of the stationary seal ring 5 and a sliding surface S2 of the rotating seal ring 3 are brought into close contact with each other and slid against each other by a spring 6 which biases the stationary seal ring 5 in the axial direction and a bellows 7. Incidentally, the sliding surface S2 of the rotating seal ring 3 is a flat surface, and recessed portions such as grooves are not provided in the flat surface.

Figures 2A, 2B:
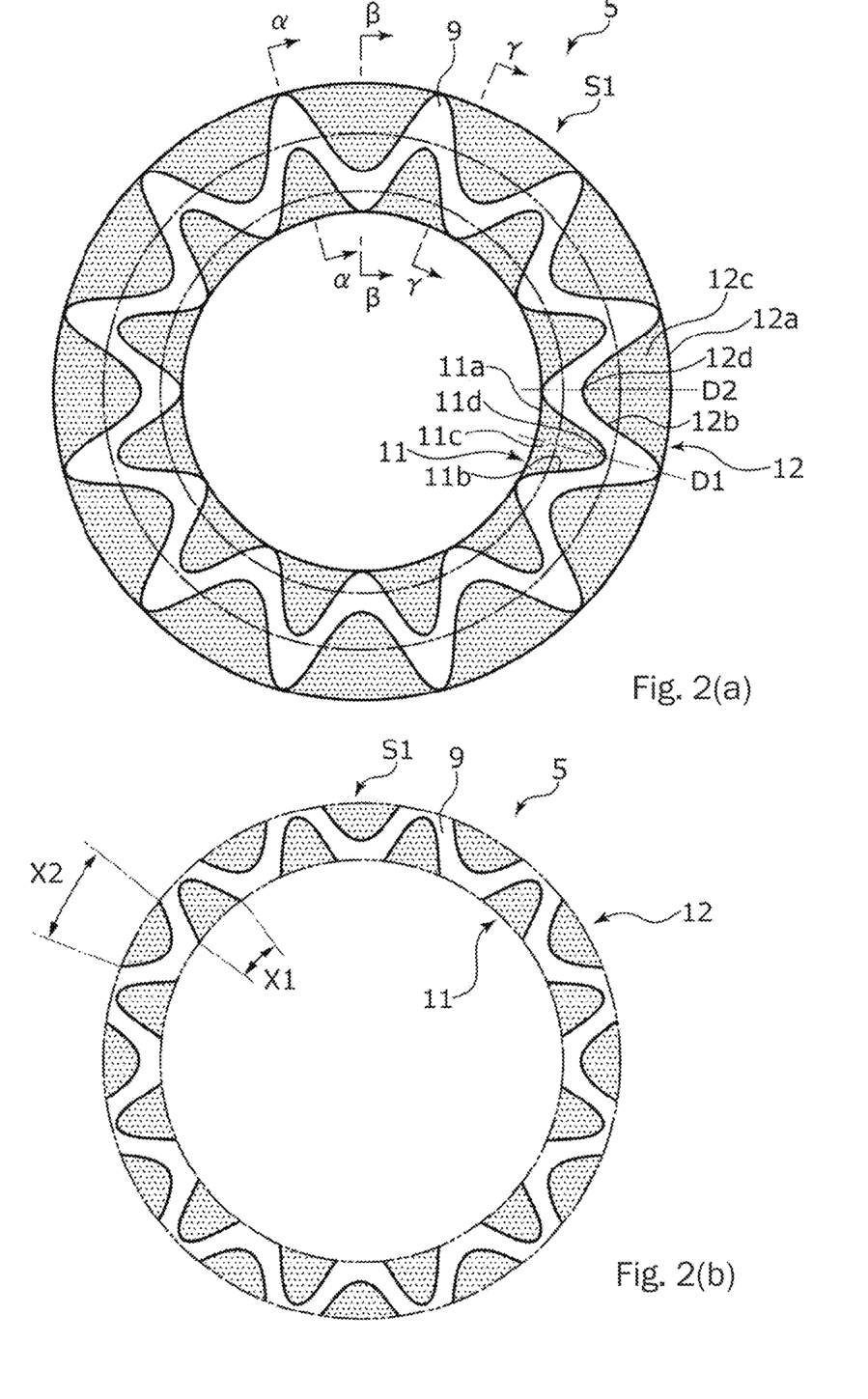
FIG. 2A is a view of a sliding surface of a stationary seal ring when seen in an axial direction in the first embodiment.
FIG. 2B is a view for describing a region of the sliding surface of the stationary seal ring in the first embodiment, the region facing a sliding surface of a rotating seal ring.
Figure 3A:
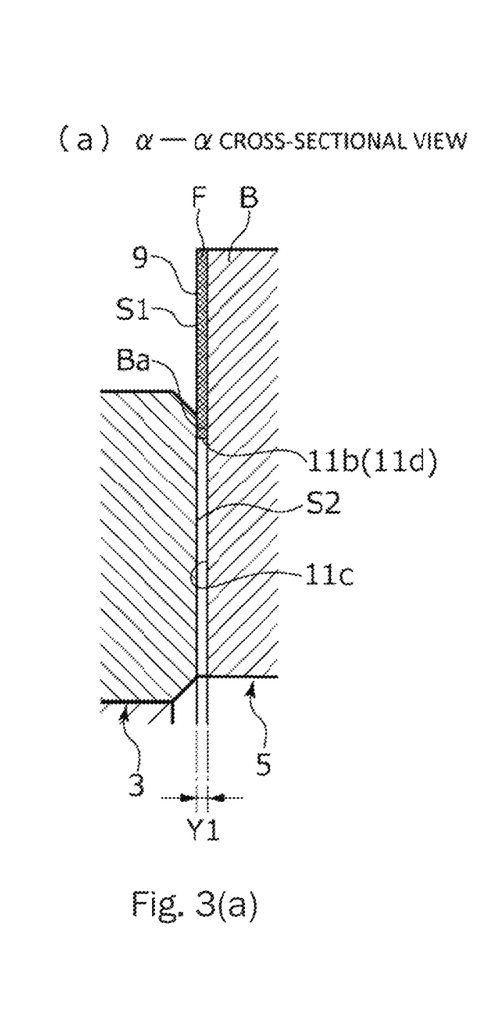
FIG. 3A is an α-α cross-sectional view of FIG. 2A.
Figure 3B:
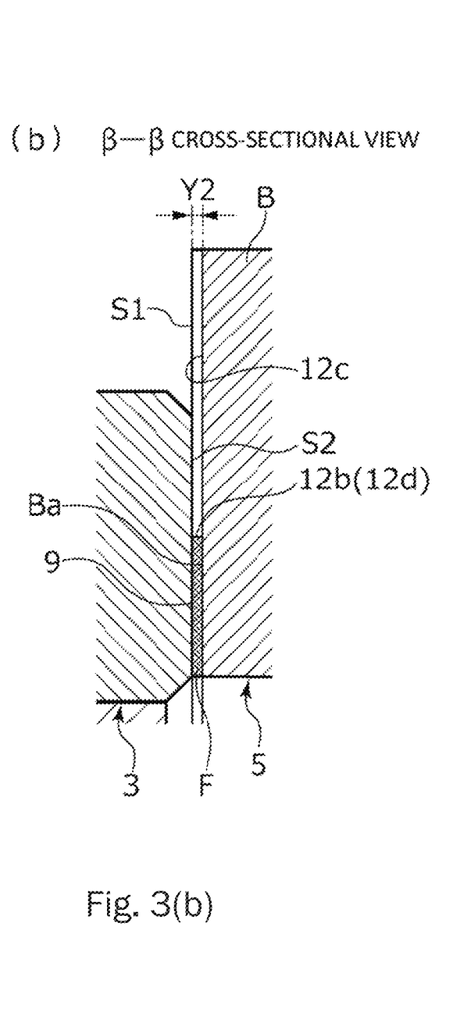
FIG. 3B is a β-β cross-sectional view of FIG. 2A.
Figure 3C:
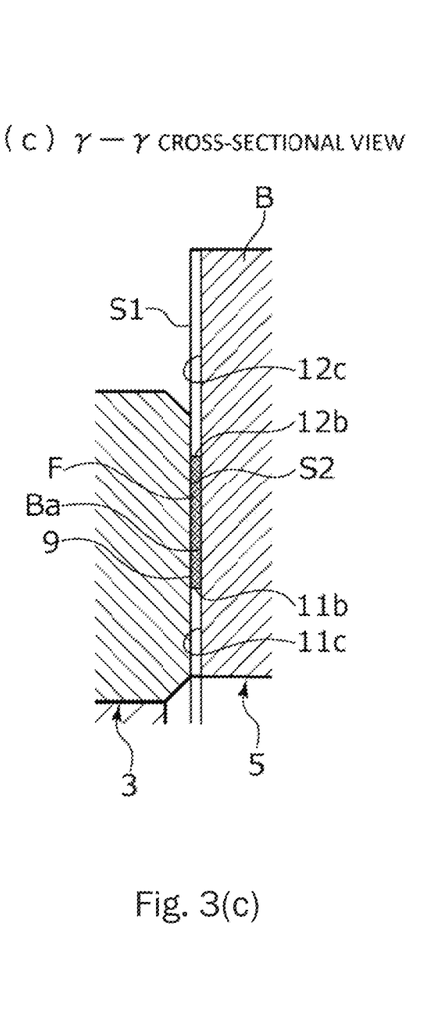
FIG. 3C is a γ-γ cross-sectional view of FIG. 2A.

As shown in FIGS. 2 and 3, in the stationary seal ring 5, a base member B is made of hard ceramics (e.g., silicon nitride, zirconia, alumina, SiC, or the like), and a diamond like carbon (abbreviated to DLC) film F is formed on a facing surface Ba facing the rotating seal ring 3 that is flat. In the present embodiment, waveform shapes having substantially the same width are formed in an annular shape in the DLC film F, and a land 9 of the sliding surface S1 is formed in a circumferential direction. Incidentally, the film is not limited to the DLC film, and a titanium nitride (abbreviated to TiN) film may be formed. Furthermore, a DLC film may be formed all over the sliding surface S2 of the rotating seal ring 3.

As shown in FIG. 2, a plurality of inward recessed portions 11 and a plurality of outward recessed portions 12 are arranged at equal intervals in the circumferential direction at locations other than the land 9 of the sliding surface S1 of the stationary seal ring 5. Namely, the sliding surface S1 is formed of the land 9, the inward recessed portions 11, and the outward recessed portions 12. The land 9 is a contact region of the sliding surface S1, and the inward recessed portions 11 and the outward recessed portions 12 are non-contact regions of the sliding surface S1.

The inward recessed portion 11 is recessed from an upper surface of the land 9 in the axial direction, has a shape that is surrounded by a quadratic curve or hyperbolic curve in a view seen in the axial direction with respect to a radial line D1 indicated by an alternate long and short dash line extending in a radial direction of the sliding surface S1, and is partitioned off by an opening portion 11a which is open to the radially inner side of the stationary seal ring 5, a peripheral wall 11b as a radially inner side peripheral edge of the land 9, and a bottom wall 11c formed of an upper surface of the base member B (refer to FIG. 3), which is substantially perpendicular to the peripheral wall 11b, extends to the radially inner side, and is parallel to the upper surface of the land 9. A radially outermost side of the inward recessed portion 11 is referred to as a closed end 11d as an outer end. In addition, in the inward recessed portion 11, a dimension X1 in the circumferential direction of a radially inner side boundary of a region facing the sliding surface S2 of the rotating seal ring 3 (refer to FIG. 2B) is longer than a dimension Y1 in the axial direction from the upper surface of the land 9 to the bottom wall 11c (refer to FIG. 3A) (i.e., X1>Y1).

The outward recessed portion 12 is recessed from the upper surface of the land 9 in the axial direction, has a shape that is surrounded by a quadratic curve or hyperbolic curve in a view seen in the axial direction with respect to a radial line D2 indicated by an alternate long and short dash line extending in the radial direction of the sliding surface S1, and is partitioned off by an opening portion 12a which is open to the radially outer side of the stationary seal ring 5, a peripheral wall 12b as a radially outer side peripheral edge of the land 9, and a bottom wall 12c formed of the upper surface of the base member B (refer to FIG. 3), which is substantially perpendicular to the peripheral wall 12b, extends to the radially outer side, and is parallel to the upper surface of the land 9. A radially innermost side of the outward recessed portion 12 is referred to as a closed end 12d as an inner end. In addition, in the outward recessed portion 12, a dimension X2 in the circumferential direction of a radially outer side boundary of the region facing the sliding surface S2 of the rotating seal ring 3 (refer to FIG. 2B) is longer than a dimension Y2 in the axial direction from the upper surface of the land 9 to the bottom wall 12c (refer to FIG. 3B) (i.e., X2>Y2). Incidentally, the closed end 12d of the outward recessed portion 12 is located closer to the radially inner side than the closed end 11d of the inward recessed portion 11, namely, the inward recessed portion 11 and the outward recessed portion 12 overlap each other in the circumferential direction.

In addition, referring to FIG. 2A, the width of the sliding surface S1 of the stationary seal ring 5 is wider than the width of the sliding surface S2 of the rotating seal ring 3 (refer to FIG. 3A) in the radial direction. For this reason, when the rotating seal ring 3 is subjected to relative rotation, even if the rotating seal ring 3 is temporarily shifted in the radial direction, the rotating seal ring 3 can slide against the stationary seal ring 5 in a state where the land 9, the inward recessed portions 11, and the outward recessed portions 12 of the sliding surface S1 of the stationary seal ring 5 are located on the entire surface of the sliding surface S2 of the rotating seal ring 3.

Figure 4A:
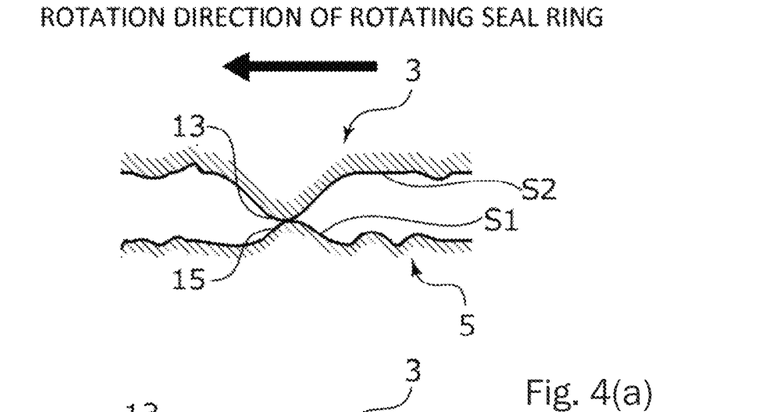
FIGS. 4A to 4D are schematic views microscopically showing a state where an external surface of the sliding surface is scraped off in the first embodiment.

Next, an operation in which wear debris 10 generated by wear of the sliding surfaces S1 and S2 is discharged will be described. The sliding surfaces S1 and S2 have a microscopically uneven shape, and as shown in FIG. 4A, when the rotating seal ring 3 rotates with respect to the stationary seal ring 5 in the direction of an arrow, a protruding portion 15 of the land 9 of the sliding surface S1 and a protruding portion 13 of the sliding surface S2 come into contact with each other. Incidentally, the sliding surfaces S1 and S2 form respective surface layers that are physically and chemically stable in a microscopic point of view (namely, inactivated), and the surface layers are shown by hatching in FIG. 4.

Figure 4B:
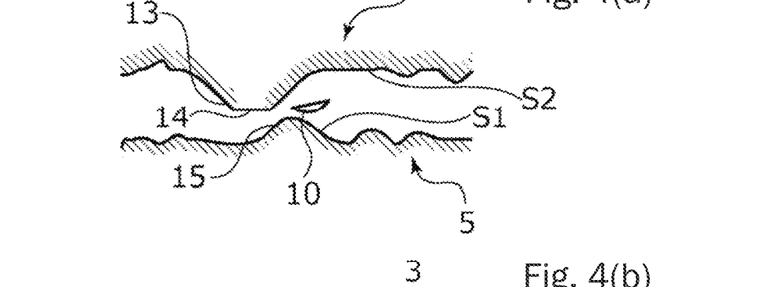
Figure 5A:
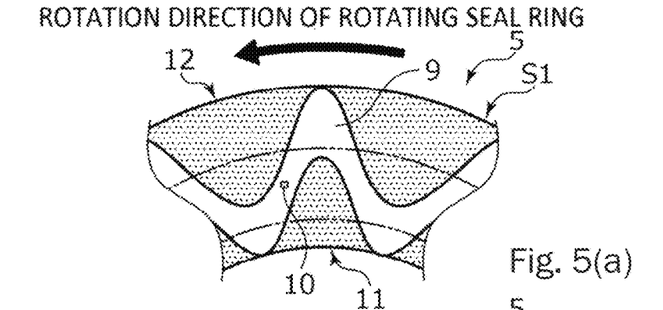
FIGS. 5A to 5E are schematic views describing the discharge of wear debris in the first embodiment.

Next, as shown in FIGS. 4B and 5A, after the protruding portions 13 and 15 have come into contact with each other, a part of one (here, assumed to be a rotating seal ring 3 side) protruding portion 13 may be chipped off to generate the fine wear debris 10. At this time, an inactivated external surface is removed at a chipped location 14 of the protruding portion 13, so that a deep portion of the rotating seal ring 3 is exposed and enters a state where the deep portion is likely to bond with another material (namely, an activated state). For example, when the rotating seal ring 3 is made of SiC, the protruding portion 13 of the external surface of the sliding surface S2 is chipped off, so that an end surface of the chipped location has a so-called bonding hand such as Si—.

Figure 4C:
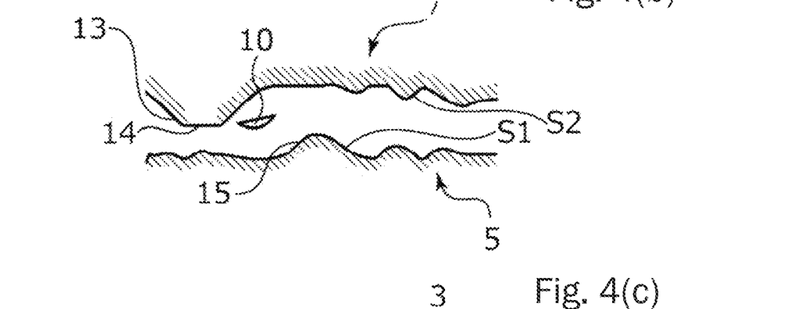
Figure 5B:
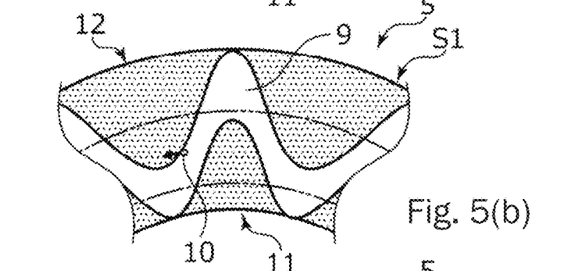
Figure 5C:
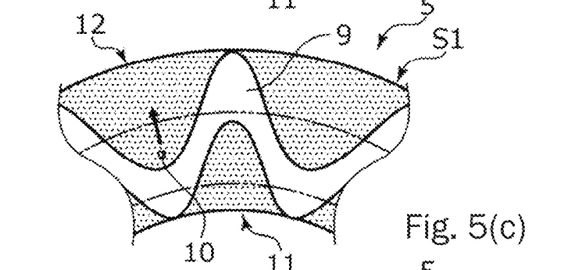
Figure 5D:
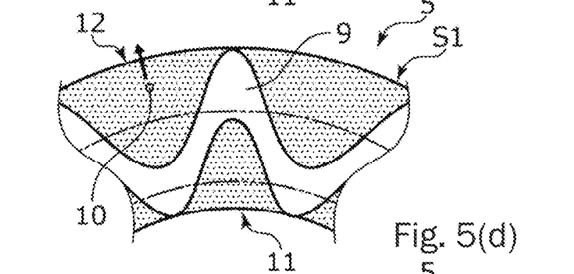
Figure 5E:
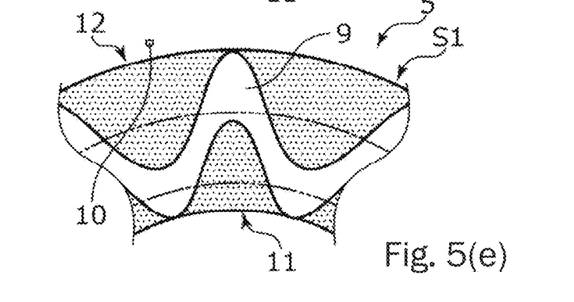

In addition, as shown in FIGS. 4C and 5B, after the wear debris 10 is caused to flow in the direction of an arrow and move from the land 9 of the sliding surface S1 to a non-contact region (i.e., outward recessed portion 12 in FIG. 5) by the sealed liquid L along with the rotation of the rotating seal ring 3, the wear debris 10 moves, together with the flow of the sealed liquid L, to the sealed liquid side and is discharged to the outside of the rotating seal ring 3 (refer to FIGS. 5C to 5E). Accordingly, since the wear debris 10 of the land 9 is collected in the outward recessed portion 12 and is promptly discharged to the outside, the wear debris 10 can be prevented from being deposited at the chipped location 14.

Figure 4D:
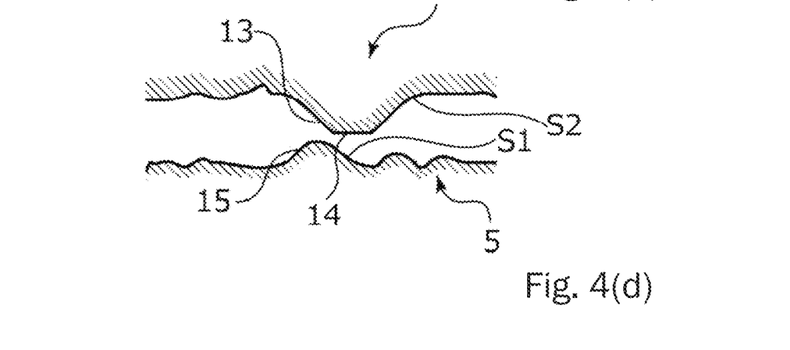

At this time, as shown in FIG. 4D, the chipped location 14 where a part of the protruding portion 13 is chipped off and an activate layer is exposed is slid for a while in the state where the chipped location 14 is exposed to the sealed liquid L, so that due to thermal, mechanical, and chemical actions, the chipped location has substantially the same structure as that of a surface layer therearound and is inactivated. For this reason, even if the wear debris 10 floats on the land 9, since the chipped location 14 is inactivated over the elapse of time, the wear debris 10 is unlikely to adhere to the chipped location 14. Incidentally, the same applies to when wear debris is generated from the DLC film F of the land 9 of the sliding surface S1.

As described above, the land 9 that can come into contact with the facing sliding surface S2 and extends in the circumferential direction, the inward recessed portions 11 that are recessed in the axial direction, extend to the radially inner side, and are open to the radially inner side, and the outward recessed portions 12 that are recessed in the axial direction, extend to the radially outer side, and are open to the radially outer side are formed in the sliding surface S1 of the stationary seal ring 5. Since at least the inward recessed portions 11 and the outward recessed portions 12 are arranged in the circumferential direction, the wear debris 10 generated in the land 9 as the rotating seal ring 3 and the stationary seal ring 5 rotate relative to each other moves along with the relative rotation, is collected in the inward recessed portion 11 or the outward recessed portion 12, and is promptly discharged to the outside. For this reason, damage to the sliding surfaces S1 and S2 can be reduced.

In addition, since the inward recessed portion 11 and the outward recessed portion 12 overlap each other in the circumferential direction, the wear debris 10 chipped off from the land 9 is likely to be reliably collected in the inward recessed portion 11 or the outward recessed portion 12 as the rotating seal ring 3 and the stationary seal ring 5 rotate relative to each other.

In addition, since the inward recessed portions 11 and the outward recessed portions 12 are alternately arranged at equal intervals in the circumferential direction, the wear debris 10 chipped off from the land 9 is likely to be reliably collected in the inward recessed portion 11 or the outward recessed portion 12 as the rotating seal ring 3 and the stationary seal ring 5 rotate relative to each other.

In addition, since the inward recessed portion 11 and the outward recessed portion 12 have a line-symmetrical shape with respect to the radial lines D1 and D2, respectively, the wear debris 10 can be reliably collected in any rotation direction.

In addition, since the inward recessed portion 11 is formed to increase in width toward the radially inner side and the outward recessed portion 12 is formed to increase in width toward the radially outer side, the wear debris 10 collected in the inward recessed portion 11 is more likely to be discharged to the radially inner side than to the sliding surface S1, and the wear debris 10 collected in the outward recessed portion 12 is more likely to be discharged to the radially outer side than to the sliding surface S1.

In addition, since the peripheral walls 11b and 12b of the inward recessed portion 11 and the outward recessed portion 12 are curved, the wear debris 10 collected in the inward recessed portion 11 or the outward recessed portion 12 is likely to be smoothly discharged to the radially inner side or the radially outer side of the sliding surface S1.

In addition, since the land 9 extends in the circumferential direction, sealing performance can be improved.

In addition, since the dimensions X1 and X2 in the circumferential direction of the boundaries of the region facing the sliding surface S2 of the rotating seal ring 3 are longer than the dimensions Y1 and Y2 in the axial direction of the inward recessed portion 11 and the outward recessed portion 12, respectively (i.e., X1>Y1 and X2>Y2), the wear debris 10 collected in the inward recessed portion 11 or the outward recessed portion 12 is likely to be discharged to the radially inner side or the radially outer side of the sliding surface S1.

In addition, since the land 9 is formed of a DLC film F or a TiN film, the height of the land 9 can be made extremely low, and the coefficient of friction generated between the rotating seal ring 3 and the stationary seal ring 5 is likely to be reduced. In addition, since the inward recessed portions 11 and the outward recessed portions 12 of the sliding surface S1 are formed shallow, intrusion of foreign material from outside can be suppressed.

Second Embodiment

A mechanical seal according to a second embodiment of the present invention will be described with reference to FIG. 6. Incidentally, description of the same and duplicated configurations as the configurations of the first embodiment will be omitted.

Figure 6A:
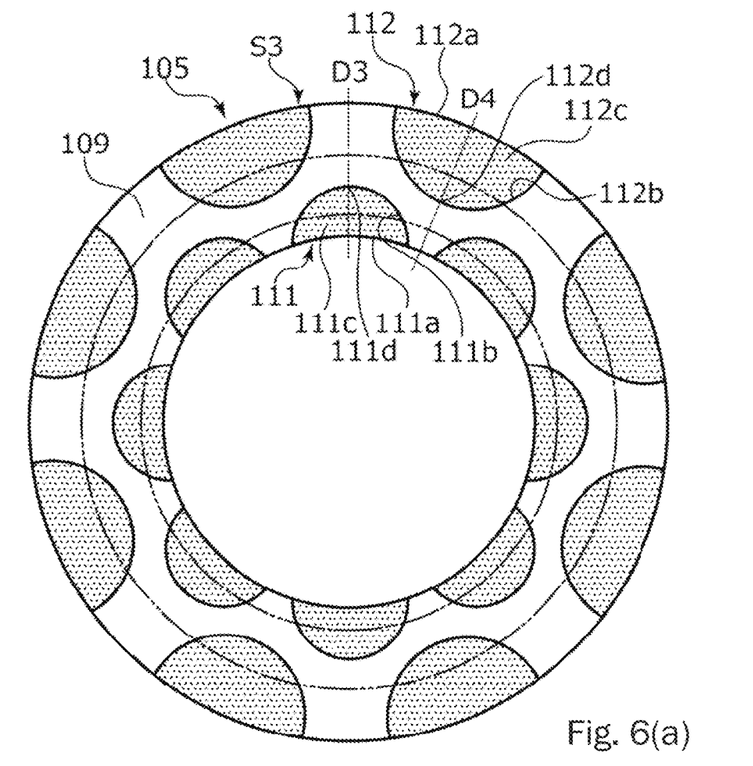
FIG. 6A is a view of a sliding surface of a stationary seal ring when seen in the axial direction in a sliding component according to a second embodiment of the present invention.
Figure 6B:
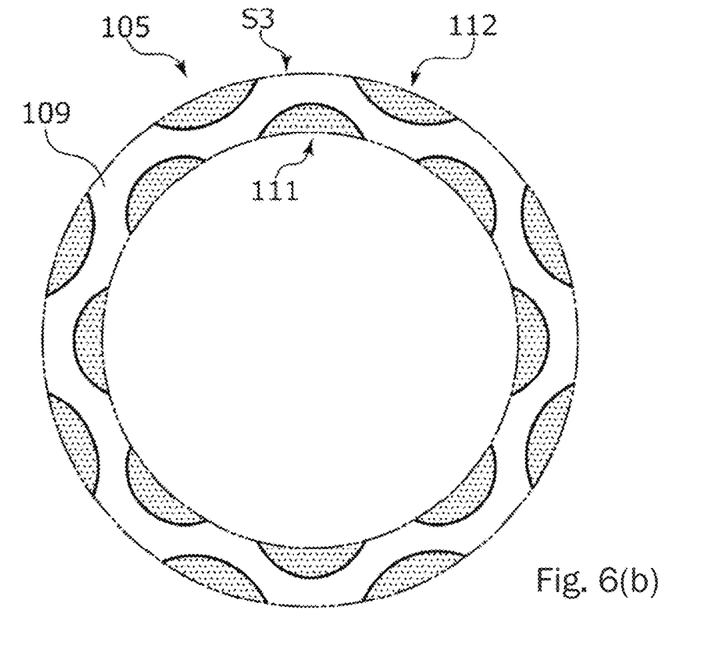
FIG. 6B is a view for describing a region of the sliding surface of the stationary seal ring in the second embodiment of the present invention, the region facing a sliding surface of a rotating seal ring.

As shown in FIG. 6, in a mechanical seal 101 according to the second embodiment of the present invention, a plurality of inward recessed portions 111 and a plurality of outward recessed portions 112 are arranged at equal intervals in a circumferential direction at locations other than a land 109 of a sliding surface S3 of a stationary seal ring 105. The inward recessed portions 111 has a shape that is surrounded by a substantially semicircle in a view seen in an axial direction with respect to a radial line D3 indicated by an alternate long and short dash line extending in a radial direction of the sliding surface S3, and is partitioned off by an opening portion 111a which is open to a radially inner side of the stationary seal ring 105, a peripheral wall 111b which has an arc shape and forms a radially inner side peripheral edge of the land 109, and a bottom wall 111c formed of the upper surface of the base member B, which is substantially perpendicular to the peripheral wall 111b, extends to the radially inner side, and is parallel to an upper surface of the land 109. A radially outermost side of the inward recessed portions 111 is referred to as a closed end 111d.

The outward recessed portions 112 has a shape that is surrounded by a semicircle in a view seen in the axial direction with respect to a radial line D4 indicated by an alternate long and short dash line extending in the radial direction of the sliding surface S3, and is partitioned off by an opening portion 112a which is open to a radially outer side of the stationary seal ring 105, a peripheral wall 112b forming a radially outer side peripheral edge of the land 109, and a bottom wall 112c formed of the upper surface of the base member B, which is substantially perpendicular to the peripheral wall 112b, extends to the radially outer side, and is parallel to the upper surface of the land 109. A radially innermost side of the outward recessed portions 112 is referred to as a closed end 112d.

Similar to the first embodiment, after the wear debris 10 generated by wear of the sliding surfaces S3 and S2 is caused to flow in a rotation direction and move from the land 109 of the sliding surface S3 to the inward recessed portions 111 or the outward recessed portions 112 by the sealed liquid L along with the rotation of the rotating seal ring 3, the wear debris 10 is discharged, together with the flow of the sealed liquid L, to the outside of the rotating seal ring 3.

In addition, the closed end 111d of the inward recessed portions 111 and the closed end 112d of the outward recessed portions 112 are arranged on respective substantially concentric circles. For this reason, the closed end 111d of the inward recessed portions 111 and the closed end 112d of the outward recessed portions 112 are aligned with each other in the circumferential direction. Therefore, the wear debris 10 chipped off from the land 109 is likely to be reliably collected in the inward recessed portions 111 or the outward recessed portions 112 as the rotating seal ring 3 and the stationary seal ring 105 rotate relative to each other.

Third Embodiment

A mechanical seal according to a third embodiment of the present invention will be described with reference to FIG. 7. Incidentally, description of the same and duplicated configurations as the configurations of the first embodiment will be omitted.

Figure 7A:
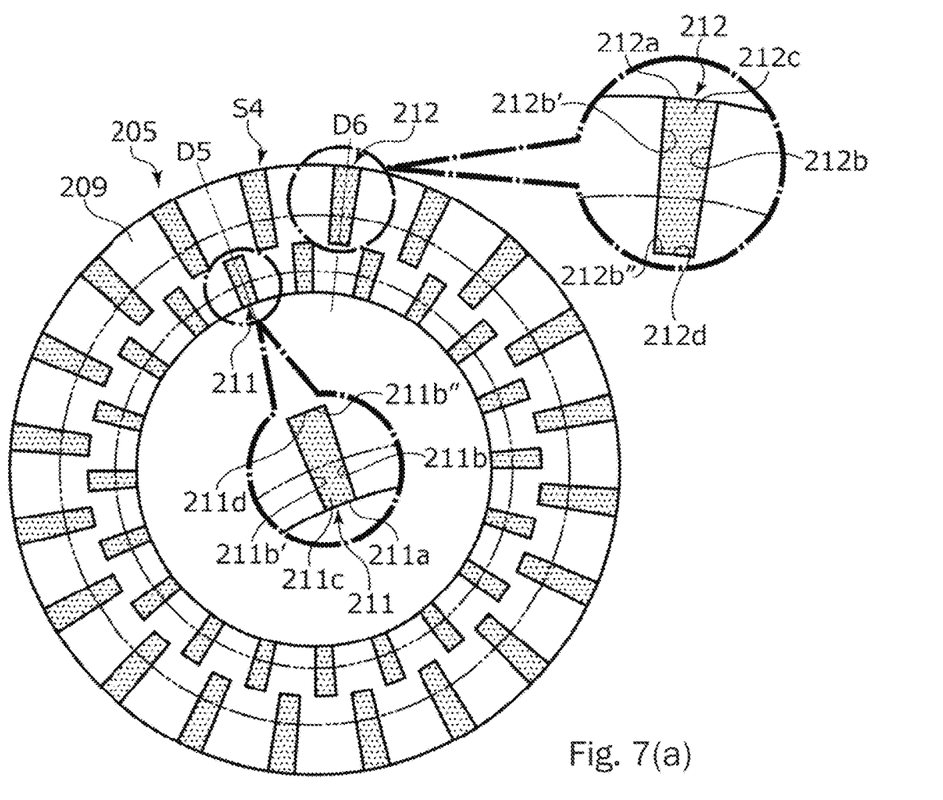
FIG. 7A is a view of a sliding surface of a stationary seal ring when seen in the axial direction in a sliding component according to a third embodiment of the present invention.
Figure 7B:
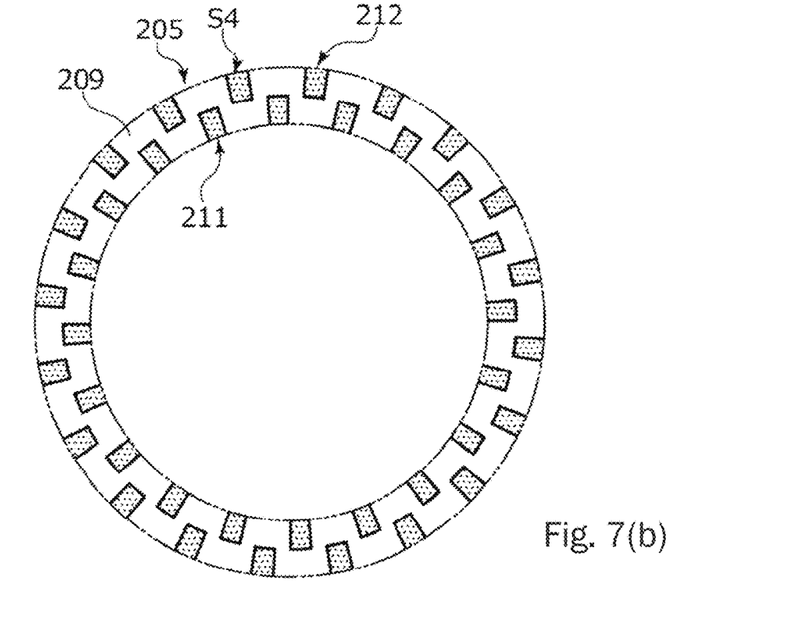
FIG. 7B is a view for describing a region of the sliding surface of the stationary seal ring in the third embodiment of the present invention, the region facing a sliding surface of a rotating seal ring.

As shown in FIG. 7, in a mechanical seal 201 according to the third embodiment of the present invention, a plurality of inward recessed portions 211 and a plurality of outward recessed portions 212 are arranged at equal intervals in a circumferential direction at locations other than a land 209 of a sliding surface S4 of a stationary seal ring 205. The inward recessed portion 211 has a shape that is surrounded by a substantially rectangular shape in a view seen in an axial direction with respect to a radial line D5 indicated by an alternate long and short dash line extending in a radial direction of the sliding surface S4, and is partitioned off by an opening portion 211a which is open to a radially inner side of the stationary seal ring 205, peripheral walls 211b, 211b', and 211b" forming a radially inner side peripheral edge of the land 209, and a bottom wall 211c formed of the upper surface of the base member B, which is substantially perpendicular to the peripheral walls 211b, 211b', and 211b", extends to the radially inner side, and is parallel to an upper surface of the land 209. A radially outermost side of the inward recessed portion 211 is referred to as a closed end 211d.

The outward recessed portion 212 has a shape that is surrounded by a rectangular shape in a view seen in an axial direction with respect to a radial line D6 indicated by an alternate long and short dash line extending in the radial direction of the sliding surface S4, and is partitioned off by an opening portion 212a which is open to a radially outer side of the stationary seal ring 205, peripheral walls 212b, 212b', and 212b" forming a radially outer side peripheral edge of the land 209, and a bottom wall 212c formed of the upper surface of the base member B, which is substantially perpendicular to the peripheral walls 212b, 212b', and 212b", extends to the radially outer side, and is parallel to the upper surface of the land 209. A radially innermost side of the outward recessed portions 212 is referred to as a closed end 212d.

Similar to the first embodiment, after the wear debris 10 generated by wear of the sliding surfaces S4 and S2 is caused to flow in a rotation direction and move from the land 209 of the sliding surface S4 to the inward recessed portions 211 or the outward recessed portions 212 by the sealed liquid L along with the rotation of the rotating seal ring 3, the wear debris 10 is discharged, together with the flow of the sealed liquid L, to the outside of the rotating seal ring 3.

In addition, the closed end 211d of the inward recessed portions 211 and the closed end 212d of the outward recessed portions 212 are arranged on respective substantially concentric circles. For this reason, the closed end 211d of the inward recessed portions 211 and the closed end 212d of the outward recessed portions 212 are aligned with each other in the circumferential direction. Therefore, the wear debris 10 chipped off from the land 209 is likely to be reliably collected in the inward recessed portions 211 or the outward recessed portions 212 as the rotating seal ring 3 and the stationary seal ring 205 rotate relative to each other.

Fourth Embodiment

A mechanical seal according to a fourth embodiment of the present invention will be described with reference to FIG. 8. Incidentally, description of the same and duplicated configurations as the configurations of the first embodiment will be omitted.

Figure 8A:
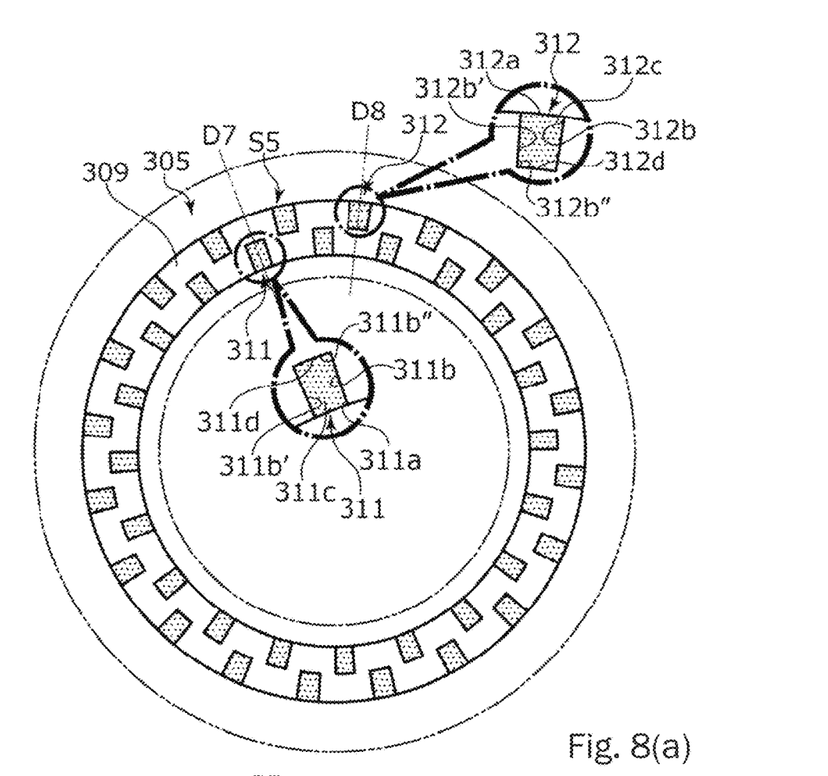
FIG. 8A is a view of a sliding surface of a stationary seal ring when seen in the axial direction in a sliding component according to a fourth embodiment of the present invention.
Figure 8B:
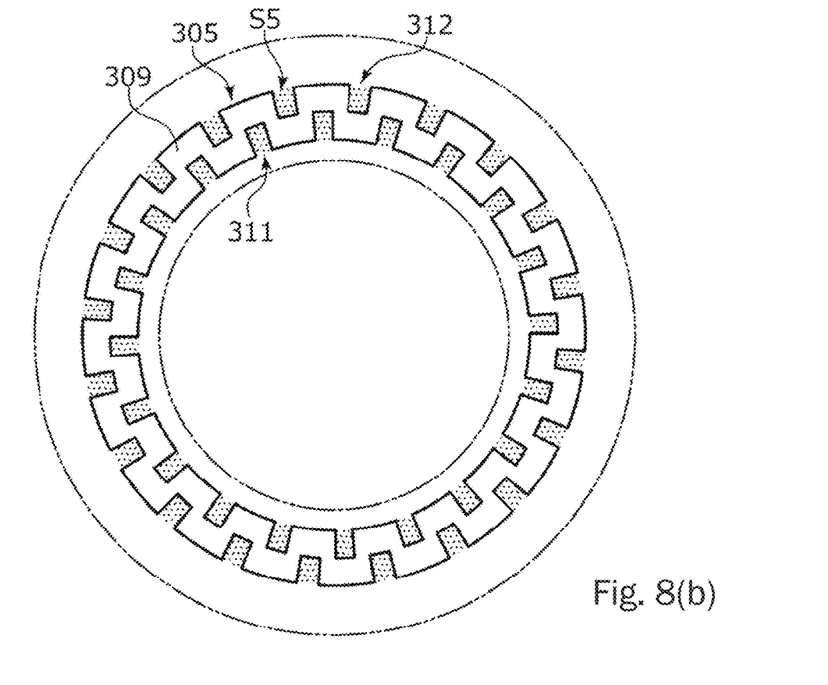
FIG. 8B is a view for describing a region of the sliding surface of the stationary seal ring in the fourth embodiment of the present invention, the region facing a sliding surface of a rotating seal ring.

As shown in FIG. 8, in a mechanical seal 301 according to the fourth embodiment of the present invention, the width in a radial direction of a sliding surface S5 of a stationary seal ring 305 is substantially the same as the width in the radial direction of the sliding surface S2 of the rotating seal ring 3, and a plurality of inward recessed portions 311 and a plurality of outward recessed portions 312 are arranged at equal intervals in a circumferential direction at locations other than a land 309 of the sliding surface S5. The inward recessed portion 311 has a shape that is surrounded by a substantially rectangular shape in a view seen in an axial direction with respect to a radial line D7 indicated by an alternate long and short dash line extending in the radial direction of the sliding surface S5, and is partitioned off by an opening portion 311a which is open to a radially inner side of the stationary seal ring 305, peripheral walls 311b, 311b', and 311b" forming a radially inner side peripheral edge of the land 309, and a bottom wall 311c formed of the upper surface of the base member B, which is substantially perpendicular to the peripheral walls 311b, 311b', and 311b", extends to the radially inner side, and is parallel to an upper surface of the land 309. A radially outermost side of the inward recessed portion 311 is referred to as a closed end 311d.

The outward recessed portion 312 has a shape that is surrounded by a rectangular shape in a view seen in an axial direction with respect to a radial line D8 indicated by an alternate long and short dash line extending in the radial direction of the sliding surface S5, and is partitioned off by an opening portion 312a which is open to a radially outer side of the stationary seal ring 305, peripheral walls 312b, 312b', and 312b" forming a radially outer side peripheral edge of the land 309, and a bottom wall 312c formed of the upper surface of the base member B, which is substantially perpendicular to the peripheral walls 312b, 312b', and 312b", extends to the radially outer side, and is parallel to the upper surface of the land 309. A radially innermost side of the outward recessed portions 312 is referred to as a closed end 312d.

Similar to the first embodiment, after the wear debris 10 generated by wear of the sliding surfaces S5 and S2 is caused to flow in a rotation direction and move from the land 309 of the sliding surface S5 to the inward recessed portions 311 or the outward recessed portions 312 by the sealed liquid L along with the rotation of the rotating seal ring 3, the wear debris 10 is discharged, together with the flow of the sealed liquid L, to the outside of the rotating seal ring 3.

In addition, the closed end 311d of the inward recessed portions 311 and the closed end 312d of the outward recessed portions 312 are arranged on respective substantially concentric circles. For this reason, the closed end 311d of the inward recessed portions 311 and the closed end 312d of the outward recessed portions 312 are aligned with each other in the circumferential direction. Therefore, the wear debris 10 chipped off from the land 309 is likely to be reliably collected in the inward recessed portions 311 or the outward recessed portions 312 as the rotating seal ring 3 and the stationary seal ring 305 rotate relative to each other.

The embodiments of the present invention have been described above with reference to the drawings; however, the specific configuration is not limited to the embodiments, and changes or additions which are made without departing from the scope of the present invention are included in the present invention.

For example, the configuration has been described in which the land is formed by providing the DLC film F on the sliding surface; however, the present invention is not limited thereto, and the land may be formed by forming recessed portions by the cutting of the sliding surface.

In addition, the configuration has been described in which the land, the inward recessed portions, and the outward recessed portions are formed in the stationary seal ring; however, the present invention is not limited thereto, and the land, the inward recessed portions, and the outward recessed portions may not be formed in one of the rotating seal ring and the stationary seal ring, but preferably, may be provided in one of the rotating seal ring and the stationary seal ring. In this case, since the relative positions of the land, the inward recessed portions, and the outward recessed portions are not shifted, not only the structure can be simplified, but also reliable sealing between the radially inner side and the radially outer side can be provided.

In addition, the configurations have been described in which the inward recessed portion 11 and the outward recessed portion 12 overlap each other in the circumferential direction in the first embodiment and in which the closed end of the inward recessed portion and the closed end of the outward recessed portion are aligned with each other in the circumferential direction in the second to fourth embodiments; however, the present invention is not limited thereto, the closed end of the inward recessed portion and the closed end of the outward recessed portion may be aligned with each other in the circumferential direction in the first embodiment, and the closed end of the inward recessed portion and the closed end of the outward recessed portion may overlap each other in the circumferential direction in the second to fourth embodiments. Further, in the first to fourth embodiments, a configuration may be adopted in which the inward recessed portion and the outward recessed portion do not overlap each other and the closed ends are not aligned with each other in the circumferential direction.

In addition, the shapes of the inward recessed portion and the outward recessed portion are not limited to the shapes provided in each embodiment, and may be, for example, a substantially triangular shape in a view seen in the axial direction.

In addition, the numbers of the inward recessed portions and the outward recessed portions are not limited to the numbers shown in FIG. 2 and FIGS. 6 to 8, and may be any number.

In addition, the configuration has been described in which the plurality of inward recessed portions and the plurality of outward recessed portions are arranged at equal intervals in the circumferential direction; however, the present invention is not limited thereto, and the plurality of inward recessed portions and the plurality of outward recessed portions may not be arranged at equal intervals in the circumferential direction.

In addition, the configuration has been described in which the plurality of inward recessed portions and the plurality of outward recessed portions are alternately arranged in the circumferential direction; however, the present invention is not limited thereto, and for example, the inward recessed portion, the inward recessed portion, the outward recessed portion, the outward recessed portion, etc. may be arranged in order in the circumferential direction.

In addition, the land may be provided with grooves for generating positive pressure or negative pressure, or dimples for improving lubricity.

REFERENCE SIGNS LIST

1 Mechanical seal
2 Sleeve
3 Rotating seal ring (seal ring)
4 Housing
5 Stationary seal ring (seal ring)
6 Spring
7 Bellows
8 Rotating shaft
9 Land
10 Wear debris
11 Inward recessed portion
11b Peripheral wall (peripheral edge)
11d Closed end (outer end)
12 Outward recessed portion
12b Peripheral wall (peripheral edge)
12d Closed end (inner end)
14 Chipped location
101 Mechanical seal
105 Stationary seal ring
109 Land
111 Inward recessed portion
112 Outward recessed portion
201 Mechanical seal
205 Stationary seal ring
309 Land
311 Inward recessed portion
312 Outward recessed portion
401 Mechanical seal
405 Stationary seal ring
409 Land
411 Inward recessed portion
412 Outward recessed portion
A Atmosphere side (low-pressure side)
B Base member
Ba Facing surface
D1 to D8 Radial line
F DLC film
L Sealed liquid
M Sealed liquid side (high-pressure side)
S1 to S5 Sliding surface
X1, X2 Dimension in circumferential direction
Y1, Y2 Dimension in axial direction

The invention claimed is:

1. A sliding component comprising a pair of seal rings which are arranged to rotate relative to each other,
   wherein the seal rings have sliding surfaces, respectively, which are facing each other,
   wherein the sliding surfaces are provided with:
   a land continuously extending in a circumferential direction;
   inward recessed portions recessed in an axial direction, extending to a radially inner side, and open to the radially inner side; and
   outward recessed portions recessed in the axial direction, extending to a radially outer side, and open to the radially outer side,
   wherein each of the inward recessed portions has a circumferential width which becomes larger toward the radially inner side,
   wherein the inward recessed portion extends, over an entire radial length thereof, both in a clockwise direction and in a counterclockwise direction with respect to one radial line passing through a radially-outermost end point of the inward recessed portion,
   wherein each of the outward recessed portions has a circumferential width which becomes larger toward the radially outer side, and
   wherein the outward recessed portion extends, over an entire radial length thereof, both in the clockwise direction and in the counterclockwise direction from a radial line passing through a radially-innermost end point of the outward recessed portion.

2. The sliding component according to claim 1, wherein the inward recessed portions and the outward recessed portions overlap each other in a view of the circumferential direction.

3. The sliding component according to claim 1, wherein both radially outer ends of the inward recessed portions and radially inner ends of the outward recessed portions are aligned on one circumferential line.

4. The sliding component according to claim 1, wherein the inward recessed portions and the outward recessed portions are alternately arranged at equal intervals in the circumferential direction.

5. The sliding component according to claim 1, wherein each of the inward recessed portions and each of the outward recessed portions have a line-symmetrical shape with respect to the radial lines, respectively.

6. The sliding component according to claim 1, wherein a peripheral edge of each of the inward recessed portions and the outward recessed portions is curved.

7. The sliding component according to claim 1,
wherein the land, the inward recessed portions, and the outward recessed portions are formed in the sliding surface of one of the seal rings.

8. The sliding component according to claim 2,
wherein the inward recessed portions and the outward recessed portions are alternately arranged at equal intervals in the circumferential direction.

9. The sliding component according to claim 2,
wherein each of the inward recessed portions and each of the outward recessed portions have a line-symmetrical shape with respect to the radial lines, respectively.

10. The sliding component according to claim 2,
wherein a peripheral edge of each of the inward recessed portions and the outward recessed portions is curved.

11. The sliding component according to claim 2,
wherein the land, the inward recessed portions, and the outward recessed portions are formed in the sliding surface of one of the seal rings.

12. The sliding component according to claim 3,
wherein the inward recessed portions and the outward recessed portions are alternately arranged at equal intervals in the circumferential direction.

13. The sliding component according to claim 3,
wherein each of the inward recessed portions and each of the outward recessed portions have a line-symmetrical shape with respect to the radial lines, respectively.

14. The sliding component according to claim 3,
wherein a peripheral edge of each of the inward recessed portions and the outward recessed portions is curved.

15. The sliding component according to claim 3,
wherein the land, the inward recessed portions, and the outward recessed portions are formed in the sliding surface of one of the seal rings.

16. The sliding component according to claim 4,
wherein each of the inward recessed portions and each of the outward recessed portions have a line-symmetrical shape with respect to the radial lines, respectively.

17. A sliding component comprising a pair of seal rings which are arranged to rotate relative to each other,
wherein the seal rings have sliding surfaces, respectively, which are facing each other,
wherein the sliding surfaces are provided with:
a land continuously extending in a circumferential direction;
inward recessed portions recessed in an axial direction, extending to a radially inner side, and open to the radially inner side; and
outward recessed portions recessed in the axial direction, extending to a radially outer side, and open to the radially outer side,
wherein each of the inward recessed portions and each of the outward recessed portions have line-symmetrical shapes with respect to radial lines and substantially rectangular shapes in plan views, respectively, and
both radially outer ends of the inward recessed portions and radially inner ends of the outward recessed portions are aligned on one circumferential line.

18. The sliding component according to claim 17,
wherein the inward recessed portions and the outward recessed portions overlap each other in a view of the circumferential direction.

19. The sliding component according to claim 17,
wherein the inward recessed portions and the outward recessed portions are alternately arranged at equal intervals in the circumferential direction.

* * * * *